(12) United States Patent
Plum et al.

(10) Patent No.: US 11,880,291 B2
(45) Date of Patent: Jan. 23, 2024

(54) MONITORING AND REPORTING A STATUS OF A MEMORY DEVICE

(71) Applicant: Micron Technology, Inc., Boise, ID (US)

(72) Inventors: Todd Jackson Plum, Boise, ID (US); Scott D. Van De Graaff, Boise, ID (US); Scott E. Schaefer, Boise, ID (US); Aaron P Boehm, Boise, ID (US); Mark D. Ingram, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/354,690

(22) Filed: Jun. 22, 2021

(65) Prior Publication Data

US 2022/0012148 A1  Jan. 13, 2022

Related U.S. Application Data

(60) Provisional application No. 63/048,748, filed on Jul. 7, 2020.

(51) Int. Cl.
*G06F 11/00* (2006.01)
*G06F 11/30* (2006.01)
(Continued)

(52) U.S. Cl.
CPC ...... *G06F 11/3037* (2013.01); *G06F 11/0772* (2013.01); *G06F 11/1417* (2013.01); *G06F 11/3075* (2013.01)

(58) Field of Classification Search
CPC ............. G06F 11/3476; G06F 11/076; G06F 11/3466; G06F 11/0751; G06F 11/0772; G06F 11/3037; G06F 11/3065
See application file for complete search history.

(56) References Cited

U.S. PATENT DOCUMENTS

| 10,573,397 | B1 * | 2/2020 | Sehgal | G11C 11/5628 |
| 2008/0034148 | A1 * | 2/2008 | Gower | G06F 11/349 711/105 |

(Continued)

FOREIGN PATENT DOCUMENTS

KR    20180031857 A    3/2018

OTHER PUBLICATIONS

ISA/KR, International Search Report and Written Opinion of the International Searching Authority, Int'l Appl. No. PCT/US2021/039152, dated Oct. 15, 2021, Korean Intellectual Property Office, Seo-gu, Daejeon, Republic of Korea, 9pgs.

*Primary Examiner* — Charles Ehne
(74) *Attorney, Agent, or Firm* — Holland & Hart LLP

(57) ABSTRACT

Methods, systems, and devices for monitoring and reporting a status of a memory device are described. A memory device may include monitoring circuitry that may be configured to monitor health and wear information for the memory device. A host device may write to a dedicated register of the memory device, to configure the memory device with health status information reporting parameters. The memory device may monitor and report the health status information of the memory device based on the received reporting configuration or based on a default configuration, and may write one or more values indicative of the health status information to a dedicated register. The host device may perform a read on the readout register to obtain the health status information, as indicated by the one or more values, and may adjust operating procedures or take other actions based on the received health status information.

25 Claims, 8 Drawing Sheets

(51) Int. Cl.
*G06F 11/14* (2006.01)
*G06F 11/07* (2006.01)

(56) References Cited

U.S. PATENT DOCUMENTS

| | | | |
|---|---|---|---|
| 2009/0063896 A1* | 3/2009 | Lastras-Montano ... | G11C 29/76 714/6.13 |
| 2010/0169536 A1* | 7/2010 | Shedel ................ | G06F 9/45558 718/1 |
| 2010/0205391 A1 | 8/2010 | Miyamoto | |
| 2013/0145077 A1* | 6/2013 | Huang ................ | G11C 16/349 711/E12.008 |
| 2017/0315879 A1 | 11/2017 | Park et al. | |
| 2020/0201707 A1 | 6/2020 | Lee | |
| 2020/0201718 A1 | 6/2020 | Richter et al. | |

* cited by examiner

MONITORING AND REPORTING A STATUS OF A MEMORY DEVICE

CROSS REFERENCE

The present Application for Patent claims the benefit of U.S. Provisional Patent Application No. 63/048,748 by PLUM et al., entitled "MONITORING AND REPORTING A STATUS OF A MEMORY DEVICE," filed Jul. 7, 2020, assigned to the assignee hereof, and expressly incorporated by reference herein.

BACKGROUND

The following relates generally to one or more systems for memory and more specifically to monitoring and reporting a status of a memory device.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Memory devices operating in the field may experience conditions unfavorable for continued operation. Device operational information (e.g., health status or warning information) relies on end-of-life data collected at the end of usage of a memory device, which may be in use for years at a time (e.g., multiple years may pass between memory device manufacture and reception of the end-of-life data). Accordingly, some end-of-life data may be inaccurate, incomplete, outdated, or any combination of these deficiencies. Generally, there exists a lack of real-time information about operating conditions of memory devices.

The present disclosure provides techniques for reporting memory device health status information and/or health warnings during operation of the memory device. For example, a memory device may include one or more monitoring components (e.g., monitoring circuitry) that may be configured to monitor health and wear information for the memory device (e.g., among other parameters). A source external to the memory device (e.g., a host device) may write to a dedicated register (e.g., a configuration register, such as a mode register) of the memory device, to configure the memory device with health status information reporting and/or monitoring parameters. The memory device may monitor and report the health status information of the memory device based on the received reporting configuration or based on a default configuration, and may write one or more values indicative of the health status information to a dedicated register (e.g., a readout register, such as a mode register).

The source external to the memory device may perform a read on the readout register (e.g., via a readout command) to obtain the health status information, as indicated by the one or more values. The source external to the memory device may adjust operating procedures or take other actions based on the received health status information, and in some cases, may transmit the health status information to one or more other devices (e.g., for further analysis). Such health status reporting provides a flexible and comprehensive way to provide health status information, including general memory device health and subsystems status. Options or parameters for reporting the health status information may include sensitivity, types of indicators, and enabling of device-level precautions.

Features of the disclosure are initially described in the context of systems and dies as described with reference to FIGS. 1 and 2. Features of the disclosure are described in the context a memory device architecture and a flow diagram as described with reference to FIGS. 3 and 4. These and other features of the disclosure are further illustrated by and described with reference to an apparatus diagram and flowcharts that relate to monitoring and reporting a status of a memory device as described with reference to FIGS. 5-8.

Figure 1:
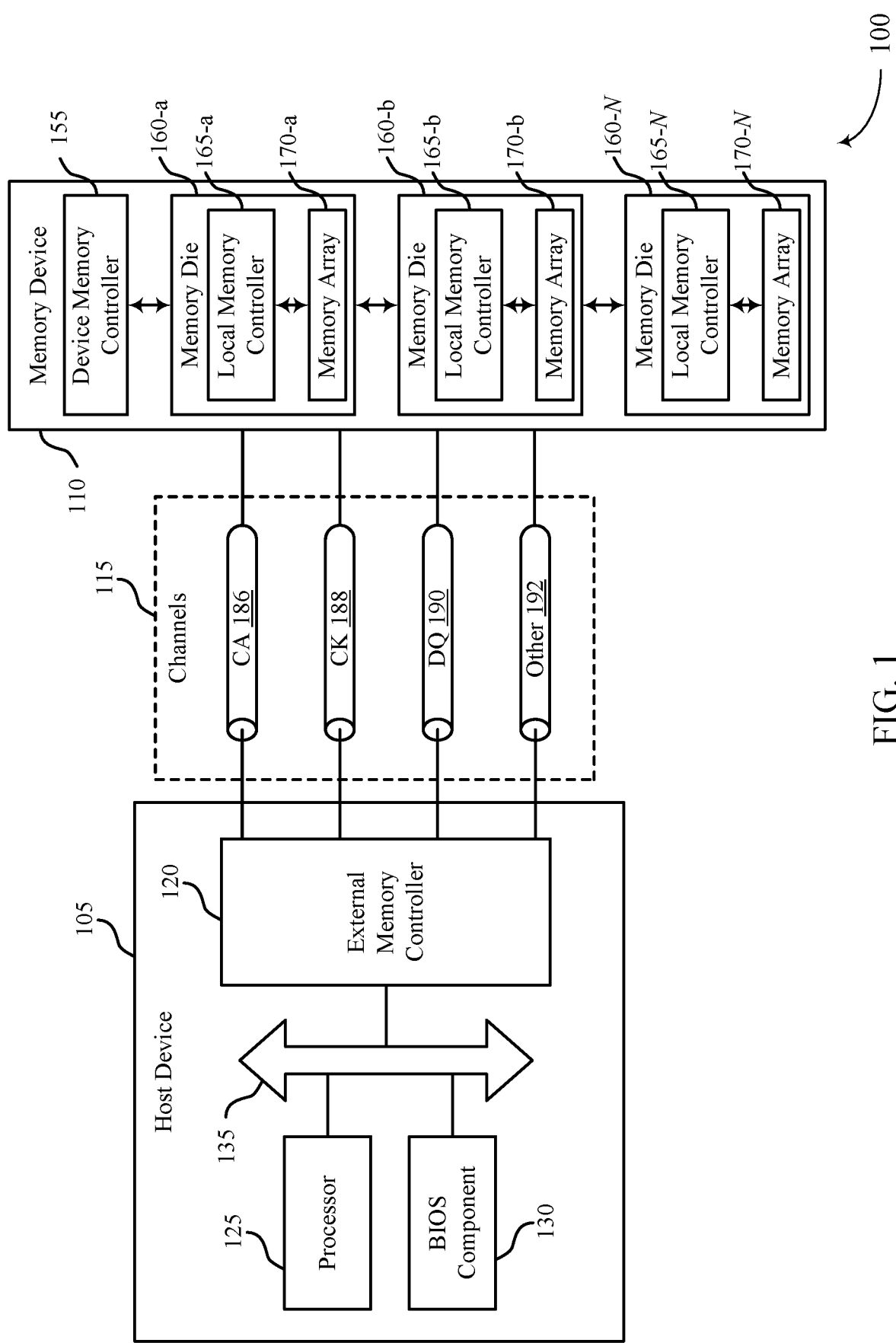
FIG. 1 illustrates an example of a system that supports monitoring and reporting a status of a memory device in accordance with examples as disclosed herein.

FIG. 1 illustrates an example of a system 100 that supports monitoring and reporting a status of a memory device in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110). In some examples, the memory system 100 may be referred to as a memory device or memory devices.

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device (e.g., a graphics processing unit (GPU)), a computer, a laptop computer, a tablet computer, a smartphone, a cellular phone, a wearable device, an internet-connected device, a vehicle controller, or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105. The host device 105 may be external to the memory device 110 and may communicate with the memory device 110. For example, the host device 105 may transmit an indication of a health status reporting configuration to the memory device 110 and may receive health status information from the memory device 110.

For example, a memory device 110 may include one or more monitoring components (e.g., monitoring circuitry) that may be configured to monitor health and wear information for the memory device 110 (e.g., among other parameters). A source external to the memory device (e.g., a host device 105) may write to a dedicated register (e.g., a configuration register, such as a mode register) of the memory device 110, to configure the memory device with health status information reporting and/or monitoring parameters. The memory device 110 may monitor and report the health status information of the memory device 110 based on the received reporting configuration or based on a default configuration, and may write one or more values indicative of the health status information to a dedicated register (e.g., a readout register, such as a mode register) such that the source external to the memory device 110 may access the information.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a slave-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of host device may be in coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a GPU, a general purpose GPU (GP-GPU), or a system on a chip (SoC), among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

In some examples, the system 100 or the host device 105 may include an input component, an output component, or both. An input component may represent a device or signal external to the system 100 that provides information, signals, or data to the system 100 or its components. In some examples, and input component may include a user interface or interface with or between other devices. In some examples, an input component may be a peripheral that interfaces with system 100 via one or more peripheral components or may be managed by an I/O controller. An output component may represent a device or signal external to the system 100 operable to receive an output from the system 100 or any of its components. Examples of an output component may include a display, audio speakers, a printing device, another processor on a printed circuit board, and others. In some examples, an output may be a peripheral that interfaces with the system 100 via one or more peripheral components or may be managed by an I/O controller.

The memory device 110 may include a device memory controller 155 and one or more memory dies 160 (e.g., memory chips) to support a desired capacity or a specified capacity for data storage. Each memory die 160 may include a local memory controller 165 (e.g., local memory controller 165-*a*, local memory controller 165-*b*, local memory controller 165-N) and a memory array 170 (e.g., memory array 170-*a*, memory array 170-*b*, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may be operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165, or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel. A channel 115 or a side channel may be used by the host device 105 and the memory device 110, for example, to communicate information regarding a health status monitoring configuration and/or health status information for the memory device 110.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, the one or more other channels 192 may include a side channel for communication of health and wear information between the host device 105 and one or more dedicated registers. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any number of signal paths to decode one or more of address or command data (e.g., eight or nine signal paths).

In some examples, clock signal channels 188 may be operable to communicate one or more clock signals between the host device 105 and the memory device 110. Each clock signal may be operable to oscillate between a high state and a low state, and may support coordination (e.g., in time) between actions of the host device 105 and the memory device 110. In some examples, the clock signal may be single ended. In some examples, the clock signal may provide a timing reference for command and addressing operations for the memory device 110, or other system-wide operations for the memory device 110. A clock signal therefore may be referred to as a control clock signal, a command clock signal, or a system clock signal. A system clock signal may be generated by a system clock, which may include one or more hardware components (e.g., oscillators, crystals, logic gates, transistors).

In some examples, DQ channels 190 may be operable to communicate one or more of data or control information between the host device 105 and the memory device 110. For example, the DQ channels 190 may communicate information (e.g., bi-directional) to be written to the memory device 110 or information read from the memory device 110.

The channels 115 may include any quantity of signal paths (including a single signal path). In some examples, a channel 115 may include multiple individual signal paths. For example, a channel may be x4 (e.g., including four signal paths), x8 (e.g., including eight signal paths), x16 (including sixteen signal paths), etc.

Figure 2:
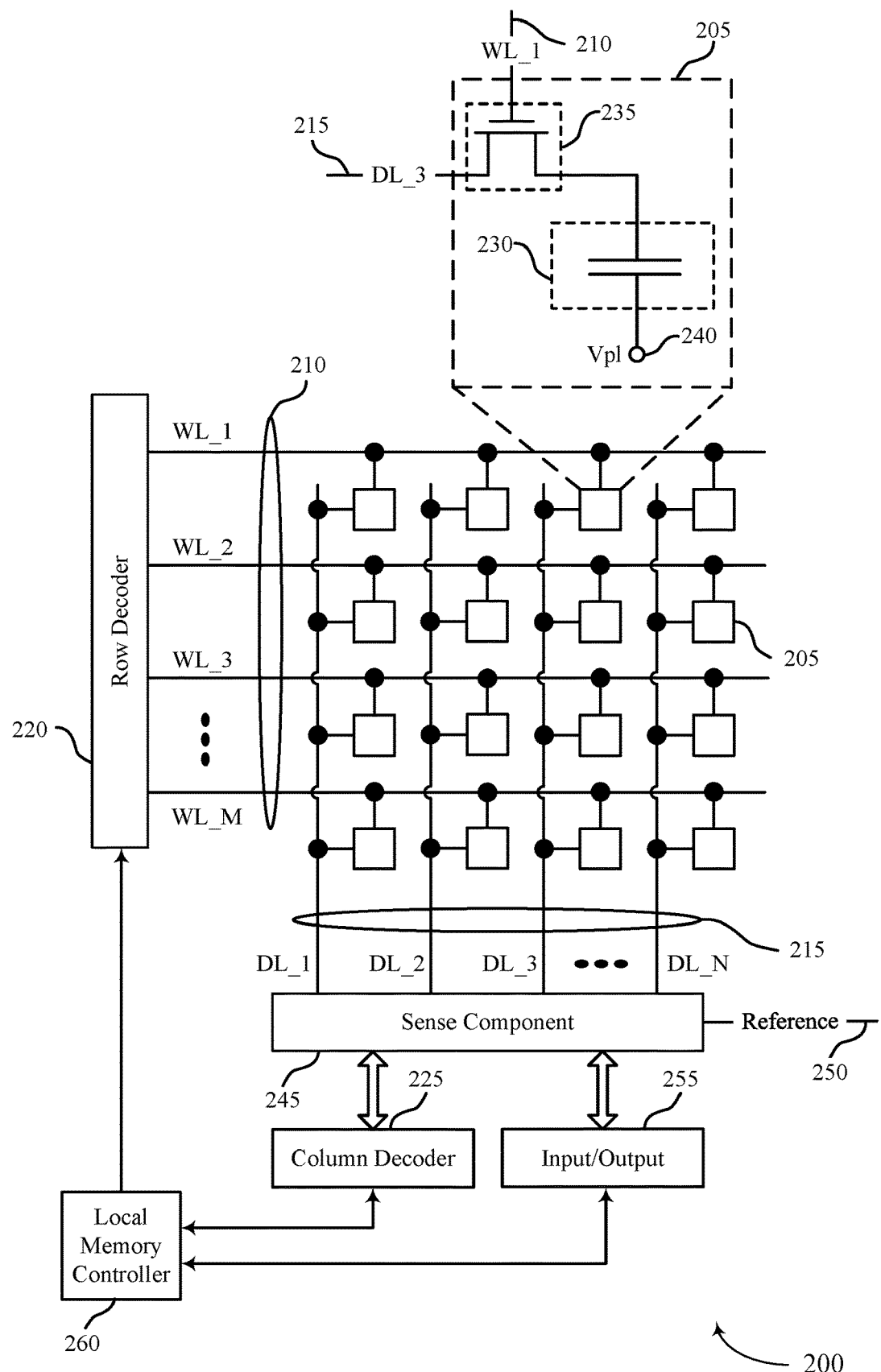
FIG. 2 illustrates an example of a memory die that supports monitoring and reporting a status of a memory device in accordance with examples as disclosed herein.

FIG. 2 illustrates an example of a memory die 200 that supports monitoring and reporting a status of a memory device in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may each be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235. The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include one or more access lines (e.g., one or more word lines 210 and one or more digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding or operation. Memory cells 205 may be positioned at intersections of the word lines 210 and the digit lines 215.

Operations such as reading and writing may be performed on the memory cells 205 by activating or selecting access lines such as one or more of a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in either a two-dimensional or three-dimensional configuration may be referred to as an address of a memory cell 205.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host device 105 based on performing the one or more operations. The local memory controller 260 may generate row signals and column address signals to activate the target word line 210 and the target digit line 215. The local memory controller 260 may also generate and control various voltages or currents used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205.

A memory device (e.g., including the memory die 200) may include one or more monitoring components (e.g., monitoring circuitry) that may be configured to monitor health and wear information for the memory device (e.g., among other parameters). For example, the monitoring component(s) may monitor a health status of one or more aspects or components of the memory die 200, as described herein. A source external to the memory device (e.g., a host device 105) may write to a dedicated register (e.g., a configuration register, such as a mode register) of the memory device (e.g., associated with the memory die 200), to configure the memory device with health status information reporting and/or monitoring parameters. The memory device may monitor and report the health status information of the memory device based on the received reporting configuration or based on a default configuration, and may write one or more values indicative of the health status information to a dedicated register (e.g., a readout register, such as a mode register) such that the source external to the memory device may access the information.

While some examples of health status reporting are described herein with reference to capacitive memory systems, it is to be understood that aspects of the disclosure may apply to other volatile or non-volatile memory systems, such as capacitive, resistive, ferroelectric, or phase change memory systems.

Figure 3:
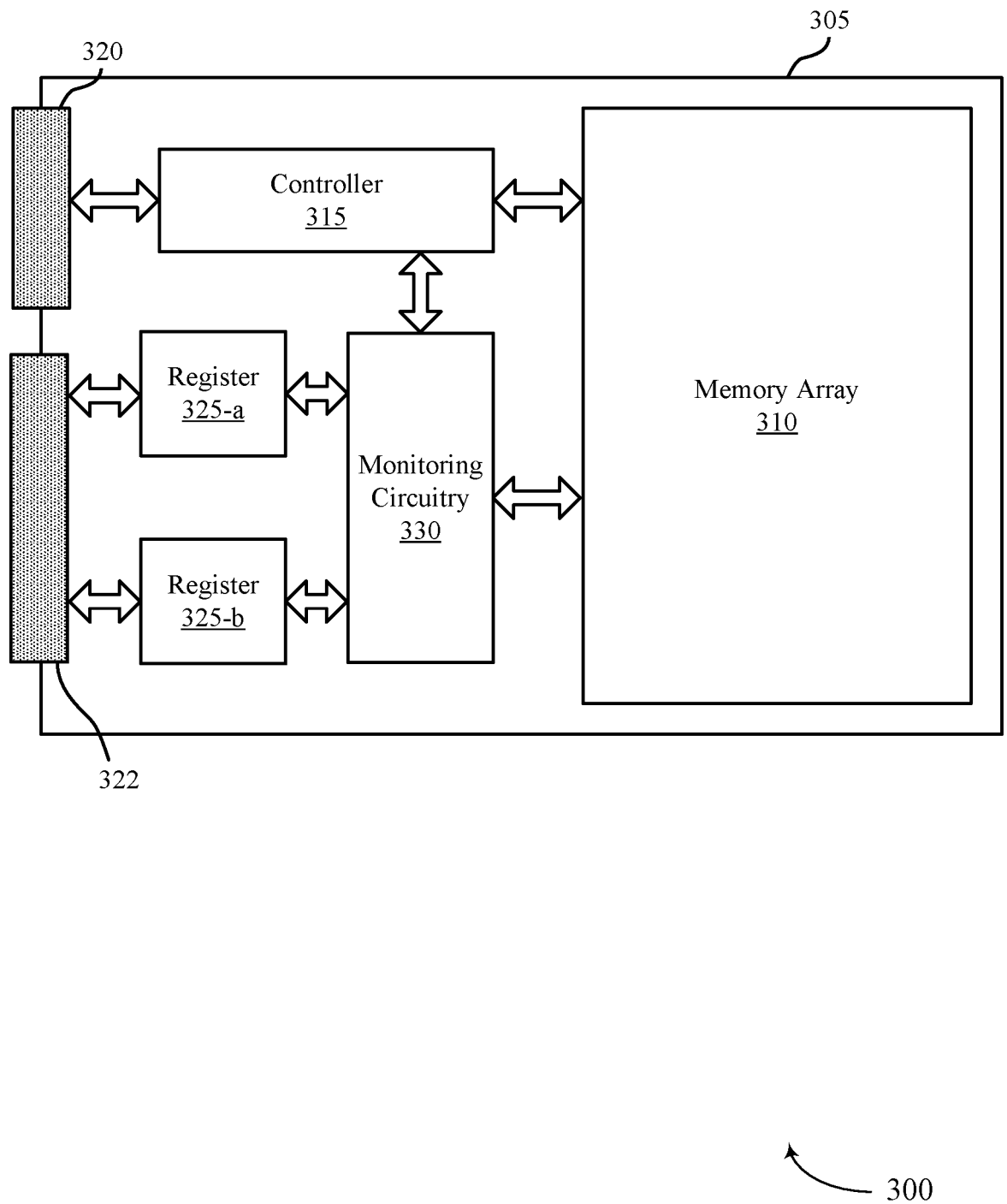
FIG. 3 illustrates an example of a memory device architecture that supports monitoring and reporting a status of a memory device in accordance with examples as disclosed herein.

FIG. 3 illustrates an example of a memory device architecture 300 that supports monitoring and reporting a status of a memory device in accordance with examples as disclosed herein. Memory device architecture 300 may include a memory device 305, which may be an example of or include aspects of a memory device 110 as described with reference to FIG. 1 or a memory die 200 as described with reference to FIG. 2. In some examples, memory device 305 may be an example of a silicon memory device.

Memory device 305 may include a memory array 310, which may be an example of aspects of a memory array 170 as described with reference to FIG. 1, or an array as described with reference to FIG. 2. The memory array 310 may be a collection (e.g., one or more grids, one or more banks, one or more tiles, one or more sections) of memory cells, with each memory cell being operable to store at least one bit of data.

Memory device 305 may also include a controller 315 coupled with the memory array 310. The controller 315 may be an example of aspects of a device memory controller 155 or a local memory controller 165 as described with reference to FIG. 1, or a local memory controller 265 as described with reference to FIG. 2. The controller 315 may be operable to control operation of the memory array 310. For example, the controller 315 may be operable to access one or more memory cells in response to a command received from a source external to the memory device 305 (e.g., a host device), and may in some cases, represent an access component. Controller 315 may also include or be coupled with decoding circuitry, such as one or more row decoders 220 or column decoders 225 as described with reference to FIG. 2, or a command decoder for decoding commands received from a source external to the memory device 305.

The controller 315 may be coupled with CA pads 320 via which the controller 315 may receive data from and transmit data to the source external to the memory device 305 (e.g., a host device). The CA pads 320 may also carry commands (e.g., access commands) and address information associated with the data. The controller 315 may be operable to store the data received via the CA pads 320 in a subset of the memory array 310 (e.g., a subset of the memory cells within the memory array 310). The CA pads 320 may be coupled (e.g., via pins, balls, bond pads, bond wires, or any other type of interconnect, or any combination thereof) with any quantity of electrically conductive materials that may be associated with communication channels 115 as described with reference to FIG. 1, including data channels 190 and CA channels 186, among other examples.

The memory device 305 may also include a side channel 322, which may be coupled with one or more registers 325 (e.g., a register 325-a and a register 325-b), which may be used to write information to the memory device 305 from the source external to the memory device 305 or read information from the memory device 305 to the source external to the memory device 305. For example, register 325-a may be configured to be written to (e.g., receive information) from the source external to the memory device 305 and register 325-b may be configured to be read by the source external to the memory device 305 (e.g., after being written to by the memory device 305). In some cases, register 325-a may represent or be referred to as a configuration register and register 325-b may represent or be referred to as a readout register. In some cases, the memory device may include more than two registers 325, and in some cases, a register 325 may be configured to be written to and read by the source external to the memory device 305 (e.g., may perform the functions of both a configuration register and a readout register).

The side channel 322 may be a dedicated serial bus (e.g., an inter-integrated circuit (I$^2$C) bus or higher-speed versions such as an VC bus), for example, for communicating with the source external to the memory device 305. The one or more registers 325 may include or represent respective examples of a mode register, or a programmable register (e.g., programmable by the source external to the memory device 305). The one or more registers 325 may serve as dedicated access points for monitoring a status or information associated with a health of the memory device 305 and may be enabled or disabled on a device basis. In some cases, one or more aspects of the one or more registers 325 may be performed by one or more other components of the memory device 305 (e.g., may be performed by portions of a controller 315).

The one or more registers 325 may be coupled with monitoring circuitry 330, where the monitoring circuitry 330 may be configured to monitor one or more health parameters of one or more corresponding systems or subsystems of the memory device 305 (e.g., one or more systems of subsystems of or associated with the memory array 310). The monitoring circuitry 330 may additionally be coupled with the controller 315 and the memory array 310. The monitoring circuitry 330 may monitor one or more health parameters of the memory device 305, for example, in accordance with a reporting configuration or a monitoring configuration received via a register 325 (e.g., register 325-a) or in accordance with a default or predefined configuration. In some examples, one or more monitoring aspects of the monitoring circuitry 330 may be enabled by a register 325 or by a configuration written to a configuration register 325 (e.g., register 325-a).

For example, the source external to the memory device 305 may load or transmit a reporting or monitoring configuration to the memory device 305 (e.g., via a configuration register 325, such as register 325-a) as part of a power-up procedure of the memory device 305 (e.g., following the power-up procedure of the memory device 305). If no reporting or monitoring configuration is received at the memory device 305 at power-up, the memory device 305

(e.g., and the corresponding monitoring circuitry 330) may load one or more default settings and may operate health monitoring based on the one or more default settings. In some cases, the source external to the memory device 305 may load or transmit a reporting or monitoring configuration to the memory device 305 (e.g., via a configuration register 325, such as register 325-a) as determined by the source external to the memory device 305. For example, the source external to the memory device 305 may determine (e.g., during operation of the memory device 305) to request or configure the memory device 305 to report health status information (e.g., based on one or more triggers or determinations at the source external to the memory device 305).

The monitoring circuitry 330 may determine one or more health parameters or status indicators based on monitoring the memory device 305, and may write a value indicative of the one or more health parameters or status indicators to a readout register 325 (e.g., register 325-b). In some examples, one or more monitoring aspects of the monitoring circuitry 330 may be self-running (e.g., may begin at a start-up of the memory device 305) and the monitoring circuitry 330 may write the value to the register 325 based on a trigger or threshold for alerting the source external to the memory device 305. For example, a system or subsystem of the memory device 305 may meet a threshold of wear or may experience an error or failure event, which may trigger the alert. In some examples, the monitoring circuitry 330 may write the value to the register 325 in response to receiving a configuration or other indication from the source external to the memory device 305.

The source external to the memory device 305 may read out the value from the readout register 325, for example, using a readout procedure (e.g., a mode register read procedure). In some cases, the readout procedure may include transmission of a readout command from the source external to the memory device 305 to the memory device 305, indicating to read out information or data from a register 325 of the memory device 305. Based on the readout command, the memory device 305 may transmit the value from the indicated register 325 to the source external to the memory device 305. Health monitoring communications (e.g., reporting configurations and/or readout values) between the memory device 305 and the source external to the memory device 305 may be transmitted using side channel 322 configured for transmission of health monitoring information. Transmission of such information via a side channel 322 may reduce impact on transmission bandwidth over the CA pads 320 between the two devices, and allow for concurrent operations including memory commands and access to the registers. In some cases, transmission via the side channel may include transmission of the health status information via a dedicated or other serial bus (e.g., I²C, I³C). Additionally or alternatively, registers 325 may be accessible via the CA pads 320, in which case the health monitoring communications may be transmitted via a data channel or a main channel (e.g., via the CA pads 320), as described herein. In some cases, use of the CA pads 320 for access to registers 325 may reduce the overall pad count for the memory device 305.

The source external to the memory device 305 may perform a write operation to one or more of the registers 325 (e.g., to a configuration register, such as register 325-a) to configure the memory device 305 with health monitoring parameters or options. The source external to the memory device 305 may configure the memory device 305 with one or more options for the health status monitoring or with one or more options for the reporting value. For example, the source external to the memory device 305 may perform a write operation to configure the memory device 305 with a monitoring sensitivity level for reporting alerts, a reaction capability for the memory device 305, a type of readout or reporting information, an indication of one or more subsystems for which to report a health status, or any combination thereof.

The memory device 305 may perform a write operation to one or more of the registers 325 (e.g., to a readout register, such as register 325-b) to indicate one or more parameters associated with a health status of the memory device 305. In a first example, the memory device 305 may write a value indicating a status flag for one or more systems or subsystems of the memory device 305 (e.g., based on a trigger event or a default or indicated configuration). For example, the memory device 305 may report a binary value for each of the one or more systems or subsystems, where the binary value may indicate whether there is a health concern or no health concern for the respective system or subsystem. In a second example, the memory device 305 may write a code indicative of a health status of a system or subsystem of the memory device 305 (e.g., based on a default or indicated configuration). For example, the memory device 305 may write a code that indicates an error of the system or subsystem, or may write a value indicative of a level of wear or usage of a system or subsystem. Additionally or alternatively, the memory device 305 may write a value indicative of a recommended action to be taken for the health of the memory device 305.

As described herein, the source external to the memory device 305 (e.g., a host device) may read out or receive the value written to the readout register 325. In some cases, the source external to the memory device 305 may be authenticated (e.g., by the memory device 305 or a component thereof) before receiving or otherwise having access to the value written to the readout register 325. For example, a host device may write a code to a dedicated register 325, which may be checked against an access code for the readout register 325. The access code may depend on a hash function of a configuration (e.g., other values of registers 325) or other parameters of memory device 305. The source external to the memory device 305 may use the value (e.g., and the information represented thereby) to perform a determination regarding an end of life for the memory device 305 or a component thereof. In some cases, the value may indicate a failure of the memory device 305, such as an occurred failure or a predicted failure (e.g., of the memory device 305 or a system or subsystem thereof).

The indication of the code, flag, or failure may be associated with a system or subsystem of the memory device 305. In some cases, the associated system or subsystem of the memory device 305 may be encoded, such that the memory device 305 may determine which system or subsystem is reported, while the source external to the memory device 305 may not have access to the information of which system or subsystem is reported. For example, the source external to the memory device 305 may determine from the health status information that a subsystem "A" is nearing end of life, but may not have information as to what subsystem is represented by subsystem "A." In some cases, the source external to the memory device 305 may have access to information to support identification of mission critical systems or subsystems reported by the memory device 305.

The source external to the memory device 305 may log health status information received from the memory device 305 as diagnostic information, as one example. In some cases, the source external to the memory device 305 may perform one or more functions or procedures based on the health status information (e.g., if the health status information indicates any alarms or other actionable information). For example, the source external to the memory device 305 may take one or more preventative steps or procedures to reduce wear on the memory device 305 (e.g., or a component thereof) based on the health status information.

The source external to the memory device 305 may, in some cases, transmit or relay the health status information received from the memory device 305 to one or more other devices (e.g., periodically, such as a certain quantity of times per year). For example, the source external to the memory device 305 may transmit an indication of the information to a device employed by system designers for the system that includes the memory device 305 and the source external to the memory device 305. Such a transmission may take place wirelessly, over a wired or electrical connection, during system operation, during system maintenance, or any combination thereof. For example, the transmission of the health status information may take place using one or more systems used to transmit real time data or feedback from the source external to the memory device 305. The health status information transmitted to the one or more other devices may include, for example, an indication of the one or more health status parameters indicated by the memory device 305, and may also include an indication of one or more corresponding systems or subsystems of the memory device 305. In some examples, the one or more other devices may send additional instructions to the source external to the memory device 305, such as mitigation actions or additional configuration options for mitigating a possible concern with operation of the memory device 305.

In some cases, the system designers may further transmit or relay the health status information to a device employed by designers or maintenance personnel for the memory device 305. Doing so may support real time feedback and guidance to the performance of the memory device 305 (e.g., and like devices) while in operation, which may support enhancements or improvements to device manufacturing and/or design.

Figure 4:
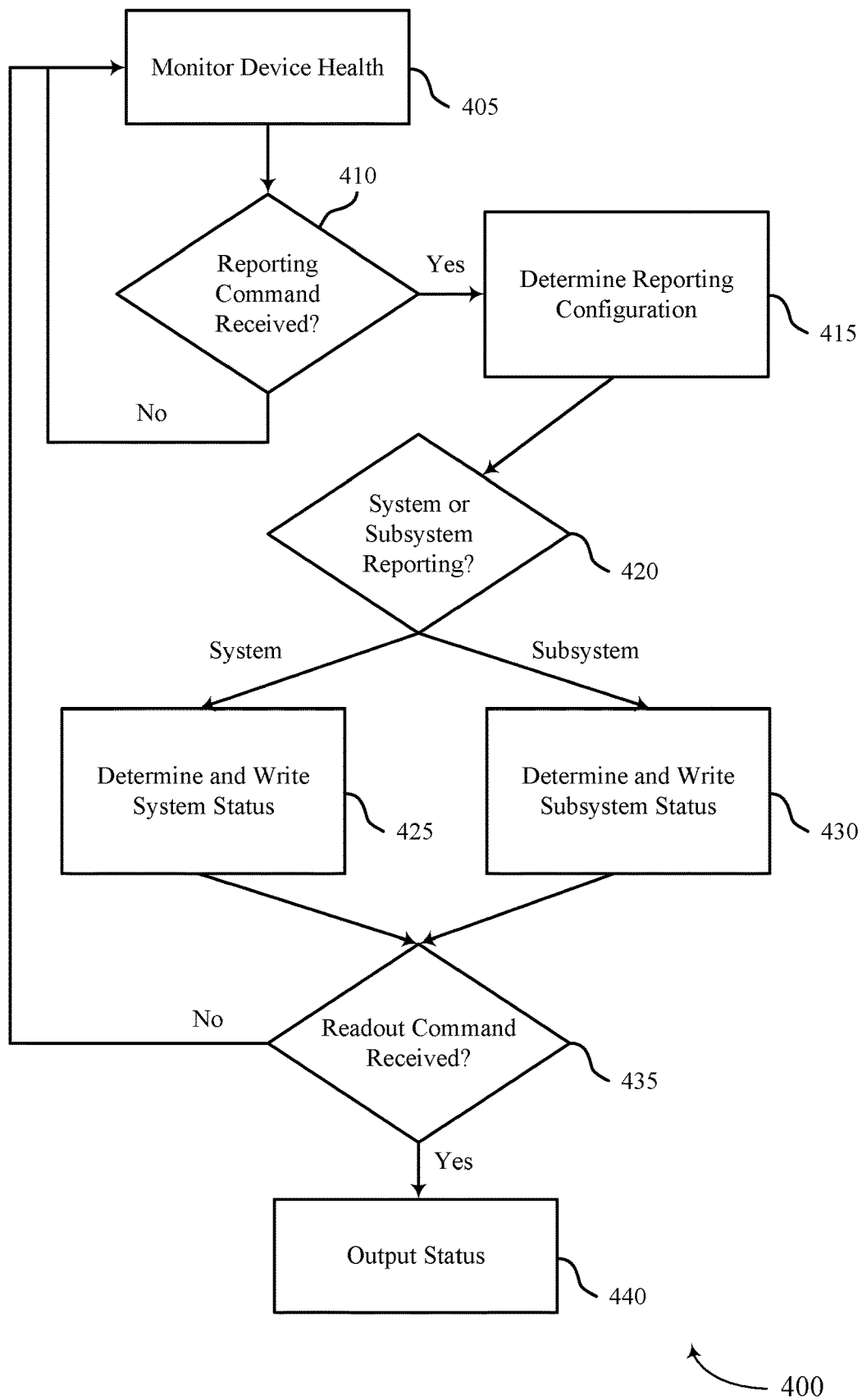
FIG. 4 illustrates an example of a flow diagram that supports monitoring and reporting a status of a memory device in accordance with examples as disclosed herein.

FIG. 4 illustrates an example of a flow diagram 400 that supports monitoring and reporting a status of a memory device in accordance with examples as disclosed herein.

Flow diagram 400 may be implemented at least in part using a memory controller, monitoring circuitry, one or more programmable registers, or any combination thereof, as described herein, for example, with reference to FIG. 3. For example, the memory controller, monitoring circuitry, and one or more programmable registers may represent corresponding examples of the respective components of a memory device as described with reference to FIG. 3. The memory device may be configured to monitor and report health status information to a source external to the memory device (e.g., a host device), and flow diagram 400 may represent one example of monitoring and reporting the health status information.

At 405, the memory device may monitor a device health or a device health status of the memory device. For example, the memory device may monitor one or more systems or subsystems of the memory device in order to determine one or more health parameters for the system or subsystem. In some cases, the memory device may begin monitoring the health status based on a configuration (e.g., a reporting configuration or command) from the source external to the memory device. In some cases, the memory device may begin monitoring the health status based on a system power up procedure (e.g., as a part of device operations, such as based on a default configuration or a received configuration).

At 410, the memory device may determine whether a reporting command or configuration has been received from the source external to the memory device. For example, the memory device may perform a system power up procedure and may determine whether a reporting configuration was received as part of the system power up. As described with reference to FIG. 3, the reporting command or configuration may include a monitoring sensitivity, a reaction parameter, a readout type, an indication of one or more systems or subsystems, or any combination thereof. The monitoring sensitivity may, for example, represent a sensitivity for triggering an alarm, where a higher sensitivity may indicate for the memory device to trigger an alarm earlier to give a larger amount of warning time. The reaction parameter may represent an action for responding to alarms at the memory device. For example, the reaction parameter may indicate for the memory device to refrain from reacting to alarms (e.g., flags within the chip) associated with the health of the memory device. In some examples, the reaction parameter may indicate for the memory device to react to alarms (e.g., flags within the chip).

The readout type may indicate a type of information or a parameter type for reporting the health status information. For example, the readout type may include an indication to report a warning flag (e.g., a binary value), or may include an indication to report a code indicative of the health status information. In some cases, if the readout type indicates to report a warning flag, the memory device may be configured to report a warning flag for each system or subsystem, or for a configured set of systems or subsystems. In some cases, if the readout type indicates to report a warning flag, the reporting configuration may further include an indication of one or more subsystems for which to report the warning flag (e.g., as indicated by a selector or a pointer in the reporting configuration). If the readout type indicates to report a code, the reporting configuration may further include an indication of one or more subsystems for which to report the code (e.g., as indicated by a selector or a pointer in the reporting configuration).

As described with reference to FIG. 3, the reporting configuration may be received at a register (e.g., a configuration register), such as via a register write operation. Different parameters of the reporting configuration may be written to different bit indices of the register, for example, as illustrated in the example of Table 1, which shows an example of different parameters that may be indicated by different bit indices.

TABLE 1

| Example Register Write Values for a Reporting Configuration | |
|---|---|
| Register Bit Index | Bit Value Indication |
| 0 | Monitor Sensitivity:<br>0 = Normal<br>1 = Give Early Warning |
| 1 | Allow Device to React:<br>0 = Don't allow device to react<br>1 = Enable reactions |
| 2 | Readout Type:<br>0 = Warning Flags<br>1 = Status Codes |
| 3-7 | Status Code Selector/Pointer:<br>00000 = Report health code<br>for overall device |

TABLE 1-continued

Example Register Write Values for a Reporting Configuration

| Register Bit Index | Bit Value Indication |
|---|---|
| | 00001 = Report health code for system or subsystem "A" |
| | 00010 = Report health code for system or subsystem "B" |
| | 00011 = Report health code for system or subsystem "C" |

In one example, the source external to the memory device may transmit or write a report configuration to the memory device in order to request a status report for a particular system or subsystem. Accordingly, each time the source external to the memory device configures the memory device with a reporting configuration, the memory device may report one or more health status parameters based on the reporting configuration. Each time the source external to the memory device configures the memory device with a new reporting configuration, the memory device may report one or more health status parameters based on the new reporting configuration.

The source external to the memory device may, for example, load or write health monitoring operational and readout parameters to a configuration register, as part of a reporting configuration, and based on a system power up procedure. The source external to the memory device may additionally or alternatively load the reporting configuration to the configuration register at any time after system power up (e.g., based on a determination to request health status information from the memory device).

If the memory device determines that a reporting command has been received, the memory device may proceed to 415. If the memory device determines that a reporting command has not been received, the memory device may return to 405 and may continue monitoring the health status of the memory device.

At 415, the memory device may determine the reporting configuration for the health status information, for example, based on the reporting configuration received from the source external to the memory device or based on a default configuration, or any combination thereof.

At 420, the memory device may determine (e.g., based on the reporting configuration) whether the health status information is to be reported for the overall device (e.g., for a system) or for a subsystem of the memory device. If the health status information is to be reported for the system (e.g., the memory device), the memory device may proceed to 425, while if the health status information is to be reported for a subsystem of the memory device, the memory device may proceed to 430.

At 425 or 430, the memory device may respectively determine the health status information for the system or for a subsystem of the memory device. For example, the memory device may use information obtained from monitoring the health status of the memory device, along with the reporting configuration, to determine one or more parameters associated with the health information status for the respective system or subsystem. For example, the memory device may determine a flag status for one or more subsystems or one or more parameters of the memory device. The memory device may write a binary indicator of the determined flag statuses to respective bit indices of a readout register, as shown by the example bit index values in Table 2. For example, a bit value of '1' may indicate an error or concern, such as a possible failure event of the memory device, while a bit value of '0' may indicate that no error or concern has been detected (e.g., since the last power up procedure).

TABLE 2

Example Register Values for Health Monitoring Reporting

| Register Bit Index | Bit Value Indication |
|---|---|
| 0 | Row hammer detected: 0 = None 1 = Yes/Concern |
| 1 | Threshold temperature exceeded: 0 = No 1 = Yes/Concern |
| 2 | Vital system health: 0 = No 1 = Concern |
| 3-7 | Indicators for other respective subsystems or parameters |

In another example, the memory device may determine a code associated with the health status information. For example, the memory device may determine a code (e.g., a preconfigured code) indicative of an error or other information associated with a subsystem or system of the memory device. Additionally or alternatively, the memory device may determine a code indicative of a level of wear or of an amount of life of the subsystem or system of the memory device. For example, the memory device may determine a value indicative of a level of wear or amount of life, or may determine a bitmap indicative of a level of wear or amount of life. This code may provide granular information regarding the health status of the memory device or a subsystem thereof, and may be used by the source external to the memory device (e.g., or by other users) to determine if one or more actions are causing system degradation (e.g., in order to take corrective action). Such information may also be used to determine or estimate an end of life for the memory device or a component thereof, and may support more accurate replacement of the memory device or component.

The memory device may write a value indicative of the code to respective bit indices in a readout register, as shown by the example bit index values in Table 3. In some examples, the values of the bits may be considered together as a value or code, such as when providing a value indicative of a level of wear or when providing a code indicative of an error. In the example shown in Table 3, the values of the bits may be considered separately, such that each bit may represent a consecutively higher level of wear, where a higher quantity of '1' values may indicate a higher level of wear (e.g., as shown in the lower rows of Table 3). For example, a register value of '00000000' may indicate no wear or a lowest level of wear, a register value of '10000000' may indicate a slightly higher level of wear, and so forth up to a value of '11111111.'

TABLE 3

Example Register Values for Health Monitoring Reporting

| Register Bit Index | 0 | 1 | 2 | 3 | 4 | 5 | 6 | 7 |
|---|---|---|---|---|---|---|---|---|
| Value | 0 | 0 | 0 | 0 | 0 | 0 | 0 | 0 |
| Register Bit Index | 0 | 1 | 2 | 3 | 4 | 5 | 6 | 7 |
| Value | 1 | 0 | 0 | 0 | 0 | 0 | 0 | 0 |
| Register Bit Index | 0 | 1 | 2 | 3 | 4 | 5 | 6 | 7 |
| Value | 1 | 1 | 0 | 0 | 0 | 0 | 0 | 0 |

TABLE 3-continued

Example Register Values for Health Monitoring Reporting

| | | | | | | | | |
|---|---|---|---|---|---|---|---|---|
| . | | | | | | | | |
| . | | | | | | | | |
| . | | | | | | | | |
| Register Bit Index | 0 | 1 | 2 | 3 | 4 | 5 | 6 | 7 |
| Value | 1 | 1 | 1 | 1 | 1 | 1 | 1 | 0 |
| Register Bit Index | 0 | 1 | 2 | 3 | 4 | 5 | 6 | 7 |
| Value | 1 | 1 | 1 | 1 | 1 | 1 | 1 | 1 |

In some cases, the memory device may include, within the data written to the readout register, an indication of a suggested action or corrective action to be performed based on the health status information. For example, the memory device may write a value indicative of a suggested corrective action such as scrambling a memory address or rewriting data.

At 435, the memory device may determine whether a readout command has been received from the source external to the memory device (e.g., in order to read out from the readout register). If no readout command has been received, the memory device may return to 405 and may continue monitoring the health status of the memory device. If a readout command has been received, the memory device may proceed to 440.

At 440, the memory device may output the value indicative of the health status information from the readout register, for example, as shown in one or more of the examples of Tables 1-3 and in accordance with reception of the readout command. The source external to the memory device may receive the value indicative of the health status information from the memory device (e.g., via a readout from the readout register), and in some cases, may take one or more actions based on the value. For example, the source external to the memory device may adjust a monitoring configuration associated with the health status information (e.g., a readout cadence), may adjust the reporting configuration (e.g., adjust a value of the configuration register such as monitoring different subsystems), may make one or more real-time changes to the memory device (e.g., or one or more components thereof), or may write the health status information to a log, among other examples.

Figure 5:
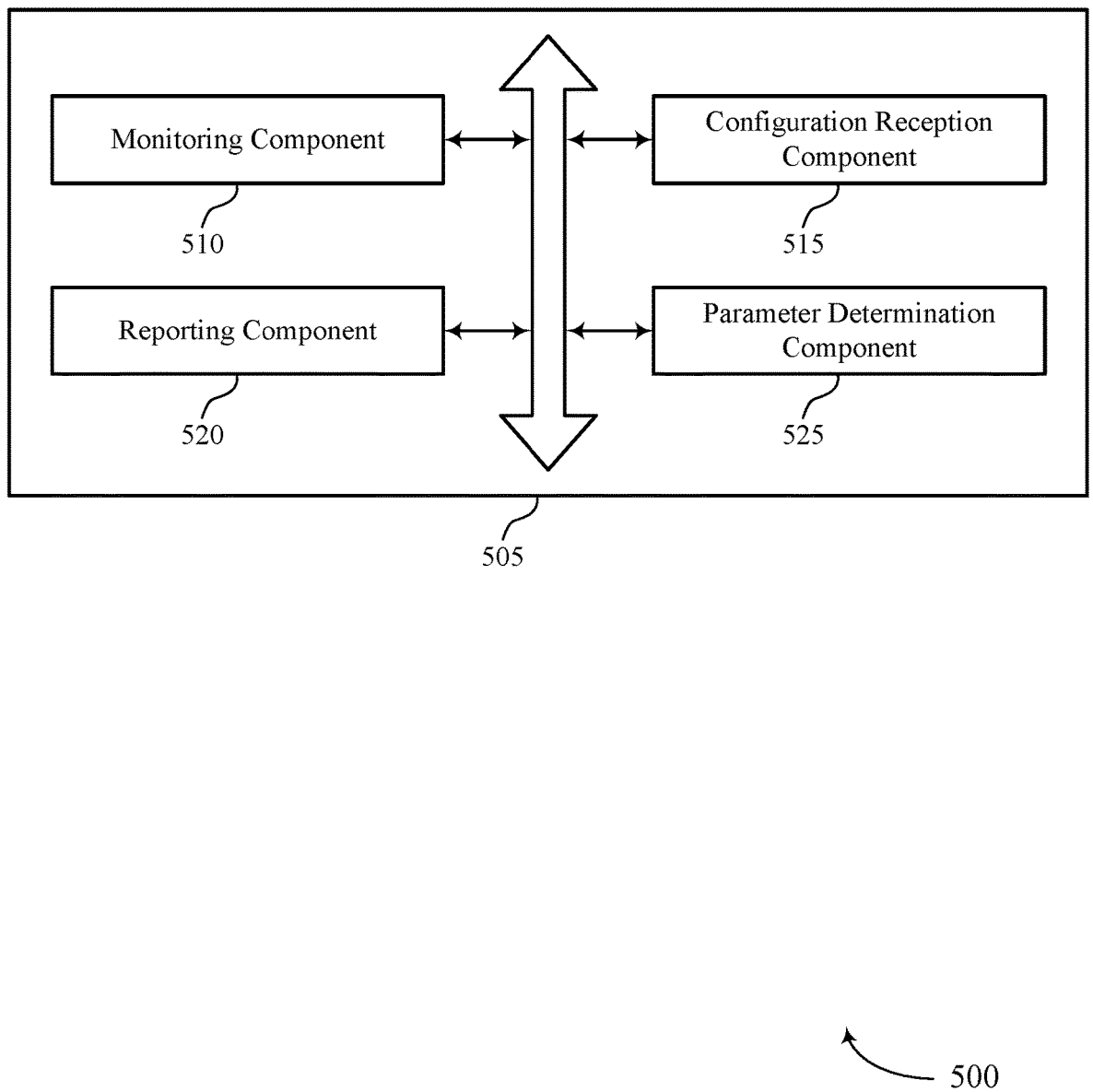
FIG. 5 shows a block diagram of a memory device that supports monitoring and reporting a status of a memory device in accordance with aspects of the present disclosure.

FIG. 5 shows a block diagram 500 of a memory device 505 that supports monitoring and reporting a status of a memory device in accordance with examples as disclosed herein. The memory device 505 may be an example of aspects of a memory device as described with reference to FIGS. 1-4. The memory device 505 may include a monitoring component 510, a configuration reception component 515, a reporting component 520, and a parameter determination component 525. Each of these modules may communicate, directly or indirectly, with one another (e.g., via one or more buses).

The monitoring component 510 may monitor a status of one or more parameters of a memory device. In some examples, the monitoring component 510 may activate at least a portion of the monitoring based on the configuration for reporting the status of the memory device.

The configuration reception component 515 may receive, at a first register of the memory device and from a source external to the memory device, an indication of a configuration for reporting the status of the memory device. In some examples, the configuration reception component 515 may receive an indication of a sensitivity level for triggering an alarm associated with reporting the status of the memory device. In some examples, the configuration reception component 515 may receive an indication of an action for responding to an alarm associated with the status of the memory device.

In some examples, the configuration reception component 515 may receive an indication of a type of indicator to use to report the status of the memory device. In some examples, the configuration reception component 515 may receive an indication of one or more subsystems of the memory device for which to report the status of the memory device. In some cases, the type of indicator includes a flag associated with a status of the parameter, or a code associated with a condition for the parameter associated with the status of the memory device.

The reporting component 520 may write a value indicative of the parameter associated with the status of the memory device to a second register of the memory device that is configured to be read by the source external to the memory device. In some examples, the reporting component 520 may write a respective value indicative of each of the one or more other parameters to the second register of the memory device, where the parameter and the one or more other parameters each include an indicator of a status for a respective subsystem of the one or more subsystems of the memory device.

In some examples, the reporting component 520 may write a code indicative of an error of a subsystem of the one or more subsystems of the memory device to the second register based on monitoring the status of the memory device and the configuration for reporting the status of the memory device, where the parameter associated with the status of the memory device includes the code indicative of the error. In some examples, the reporting component 520 may write a value indicative of a level of wear of a subsystem of the one or more subsystems of the memory device to the second register based on monitoring the status of the memory device and the configuration for reporting the status of the memory device, where the parameter associated with the status of the memory device includes the value indicative of the level of wear of the subsystem. In some examples, the reporting component 520 may write an indication of a recommended action to the second register based on writing the value indicative of the parameter associated with the status of the memory device to the second register.

The parameter determination component 525 may determine a parameter of the one or more parameters associated with the status of the memory device based on monitoring the status of the one or more parameters of the memory device and the configuration for reporting the status of the memory device. In some examples, the parameter determination component 525 may determine one or more other parameters associated with the status of the one or more subsystems based on monitoring the status of the memory device and the configuration for reporting the status of the memory device.

Figure 6:
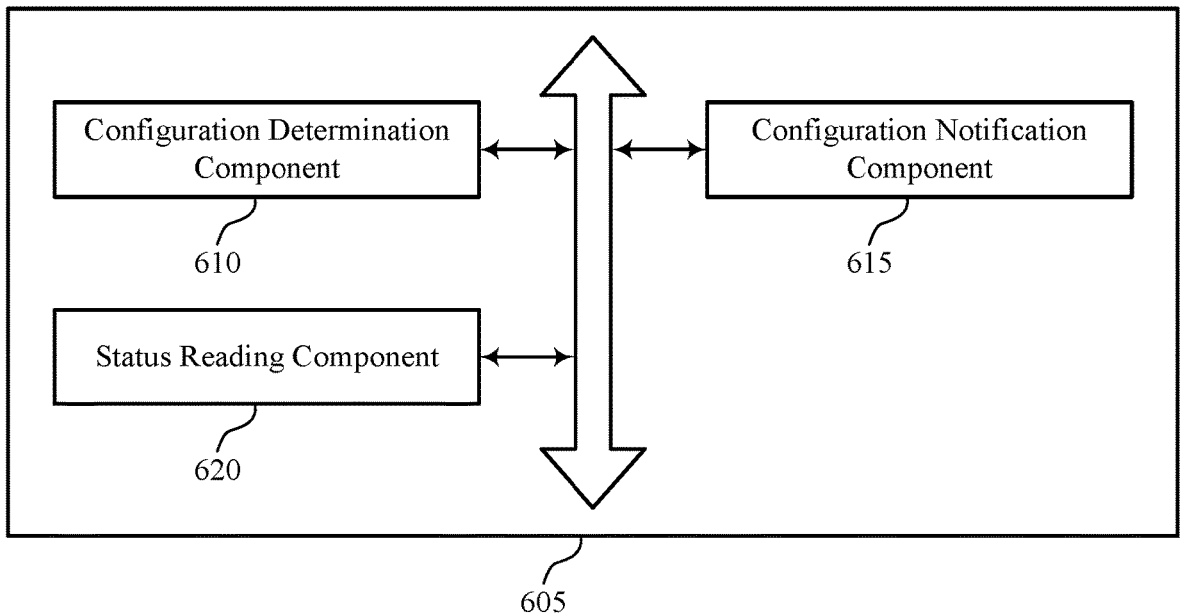
FIG. 6 shows a block diagram of a host device that supports monitoring and reporting a status of a memory device in accordance with aspects of the present disclosure.

FIG. 6 shows a block diagram 600 of a host device 605 that supports monitoring and reporting a status of a memory device in accordance with examples as disclosed herein. The host device 605 may be an example of aspects of a host device as described with reference to FIGS. 1-4. The host device 605 may include a configuration determination component 610, a configuration notification component 615, and a status reading component 620. Each of these modules may communicate, directly or indirectly, with one another (e.g., via one or more buses).

The configuration determination component 610 may identify, at a first device, a configuration for reporting a status of a memory device.

The configuration notification component 615 may write, to a first register of the memory device, an indication of the configuration for reporting the status of the memory device. In some examples, the configuration notification component 615 may transmit, to a second device, an indication of the parameter associated with the status of the memory device based on reading the value indicative of the parameter associated with the status of the memory device.

In some examples, the configuration notification component 615 may write an indication of a sensitivity level for triggering an alarm associated with reporting the status of the memory device. In some examples, the configuration notification component 615 may write an indication of an action for responding to an alarm associated with the status of the memory device. In some examples, the configuration notification component 615 may write an indication of one or more subsystems of the memory device for which to report the status of the memory device.

In some examples, the configuration notification component 615 may write an indication of a type of indicator to use to report the status of the memory device. In some examples, the configuration notification component 615 may write an indication to report the status of the memory device using a code for the parameter associated with the status of the memory device, where the code includes a value indicative of a level of wear of a subsystem of the one or more subsystems of the memory device or a code indicative of an error of the subsystem of the one or more subsystems of the memory device. In some examples, the configuration notification component 615 may write the indication of the configuration for reporting the status of the memory device is based on a boot event for the memory device.

The status reading component 620 may read, from a second register of the memory device, a value indicative of a parameter associated with the status of the memory device based on writing the indication of the configuration for reporting the status of the memory device to the first register.

Figure 7:
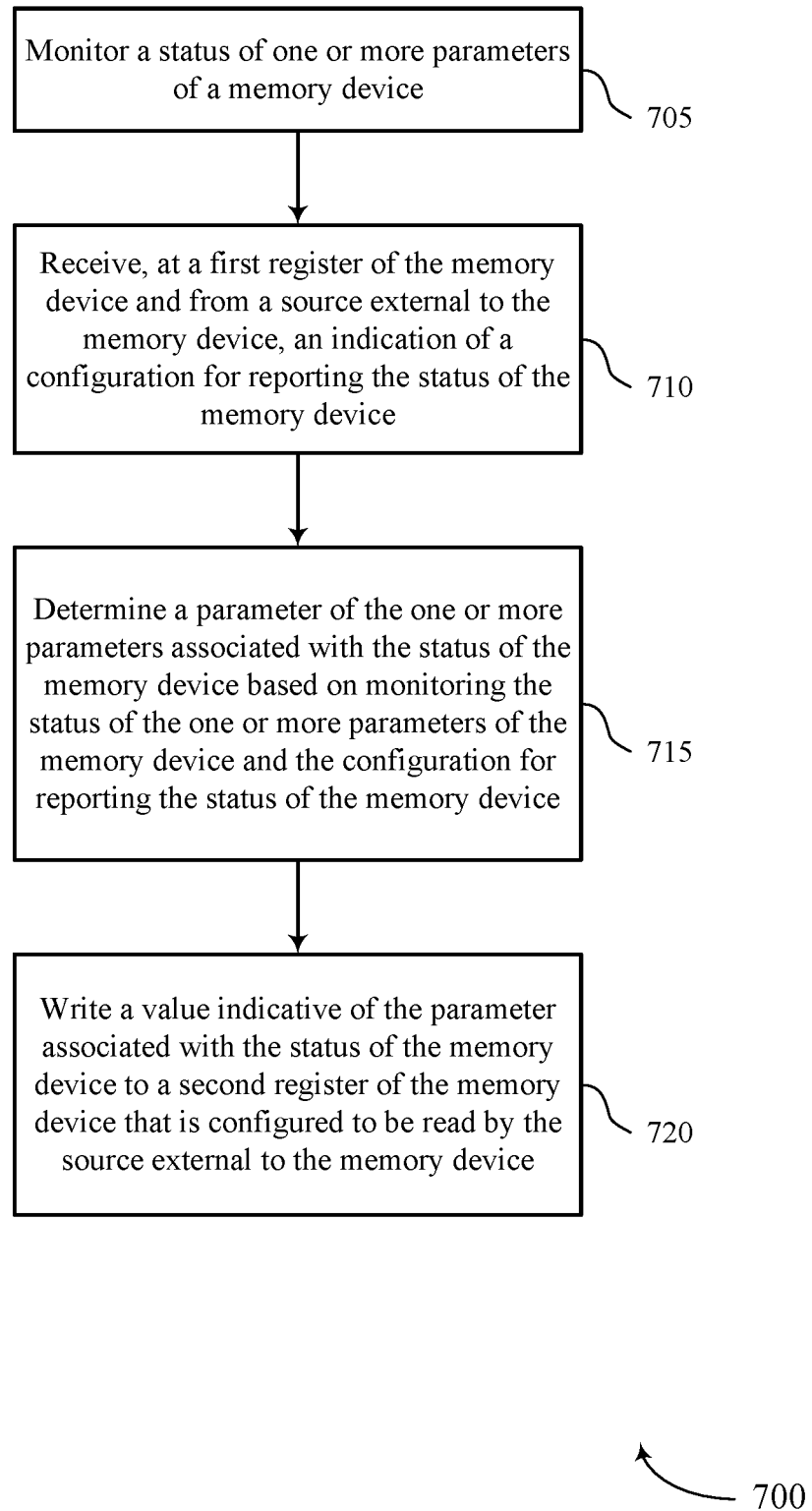
FIGS. 7 and 8 show flowcharts illustrating a method or methods that support monitoring and reporting a status of a memory device in accordance with examples as disclosed herein.

FIG. 7 shows a flowchart illustrating a method or methods 700 that supports monitoring and reporting a status of a memory device in accordance with aspects of the present disclosure. The operations of method 700 may be implemented by a memory device or its components as described herein. For example, the operations of method 700 may be performed by a memory device as described with reference to FIG. 5. In some examples, a memory device may execute a set of instructions to control the functional elements of the memory device to perform the described functions. Additionally or alternatively, a memory device may perform aspects of the described functions using special-purpose hardware.

At 705, the memory device may monitor a status of one or more parameters of a memory device. The operations of 705 may be performed according to the methods described with reference to FIGS. 3 and 4. In some examples, aspects of the operations of 705 may be performed by a monitoring component as described with reference to FIG. 5.

At 710, the memory device may receive, at a first register of the memory device and from a source external to the memory device, an indication of a configuration for reporting the status of the memory device. The operations of 710 may be performed according to the methods described with reference to FIGS. 3 and 4. In some examples, aspects of the operations of 710 may be performed by a configuration reception component as described with reference to FIG. 5.

At 715, the memory device may determine a parameter of the one or more parameters associated with the status of the memory device based on monitoring the status of the one or more parameters of the memory device and the configuration for reporting the status of the memory device. The operations of 715 may be performed according to the methods described with reference to FIGS. 3 and 4. In some examples, aspects of the operations of 715 may be performed by a parameter determination component as described with reference to FIG. 5.

At 720, the memory device may write a value indicative of the parameter associated with the status of the memory device to a second register of the memory device that is configured to be read by the source external to the memory device. The operations of 720 may be performed according to the methods described with reference to FIGS. 3 and 4. In some examples, aspects of the operations of 720 may be performed by a reporting component as described with reference to FIG. 5.

In some examples, an apparatus as described herein may perform a method or methods, such as the method 700. The apparatus may include features, means, or instructions (e.g., a non-transitory computer-readable medium storing instructions executable by a processor) for monitoring a status of one or more parameters of a memory device, receiving, at a first register of the memory device and from a source external to the memory device, an indication of a configuration for reporting the status of the memory device, determining a parameter of the one or more parameters associated with the status of the memory device based on monitoring the status of the one or more parameters of the memory device and the configuration for reporting the status of the memory device, and writing a value indicative of the parameter associated with the status of the memory device to a second register of the memory device that is configured to be read by the source external to the memory device.

In some examples of the method 700 and the apparatus described herein, receiving the indication of the configuration for reporting the status of the memory device may include operations, features, means, or instructions for receiving an indication of a sensitivity level for triggering an alarm associated with reporting the status of the memory device.

In some examples of the method 700 and the apparatus described herein, receiving the indication of the configuration for reporting the status of the memory device may include operations, features, means, or instructions for receiving an indication of an action for responding to an alarm associated with the status of the memory device.

In some examples of the method 700 and the apparatus described herein, receiving the indication of the configuration for reporting the status of the memory device may include operations, features, means, or instructions for receiving an indication of a type of indicator to use to report the status of the memory device.

In some examples of the method 700 and the apparatus described herein, the type of indicator includes a flag associated with a status of the parameter, or a code associated with a condition for the parameter associated with the status of the memory device.

In some examples of the method 700 and the apparatus described herein, receiving the indication of the configuration for reporting the status of the memory device may include operations, features, means, or instructions for receiving an indication of one or more subsystems of the memory device for which to report the status of the memory device.

Some examples of the method 700 and the apparatus described herein may further include operations, features, means, or instructions for determining one or more other parameters associated with the status of the one or more subsystems based on monitoring the status of the memory device and the configuration for reporting the status of the memory device, and writing a respective value indicative of each of the one or more other parameters to the second register of the memory device, where the parameter and the one or more other parameters each include an indicator of a status for a respective subsystem of the one or more subsystems of the memory device.

Some examples of the method 700 and the apparatus described herein may further include operations, features, means, or instructions for writing a code indicative of an error of a subsystem of the one or more subsystems of the memory device to the second register based on monitoring the status of the memory device and the configuration for reporting the status of the memory device, where the parameter associated with the status of the memory device includes the code indicative of the error.

Some examples of the method 700 and the apparatus described herein may further include operations, features, means, or instructions for writing a value indicative of a level of wear of a subsystem of the one or more subsystems of the memory device to the second register based on monitoring the status of the memory device and the configuration for reporting the status of the memory device, where the parameter associated with the status of the memory device includes the value indicative of the level of wear of the subsystem.

Some examples of the method 700 and the apparatus described herein may further include operations, features, means, or instructions for writing an indication of a recommended action to the second register based on writing the value indicative of the parameter associated with the status of the memory device to the second register.

Some examples of the method 700 and the apparatus described herein may further include operations, features, means, or instructions for activating at least a portion of the monitoring based on the configuration for reporting the status of the memory device.

Figure 8:
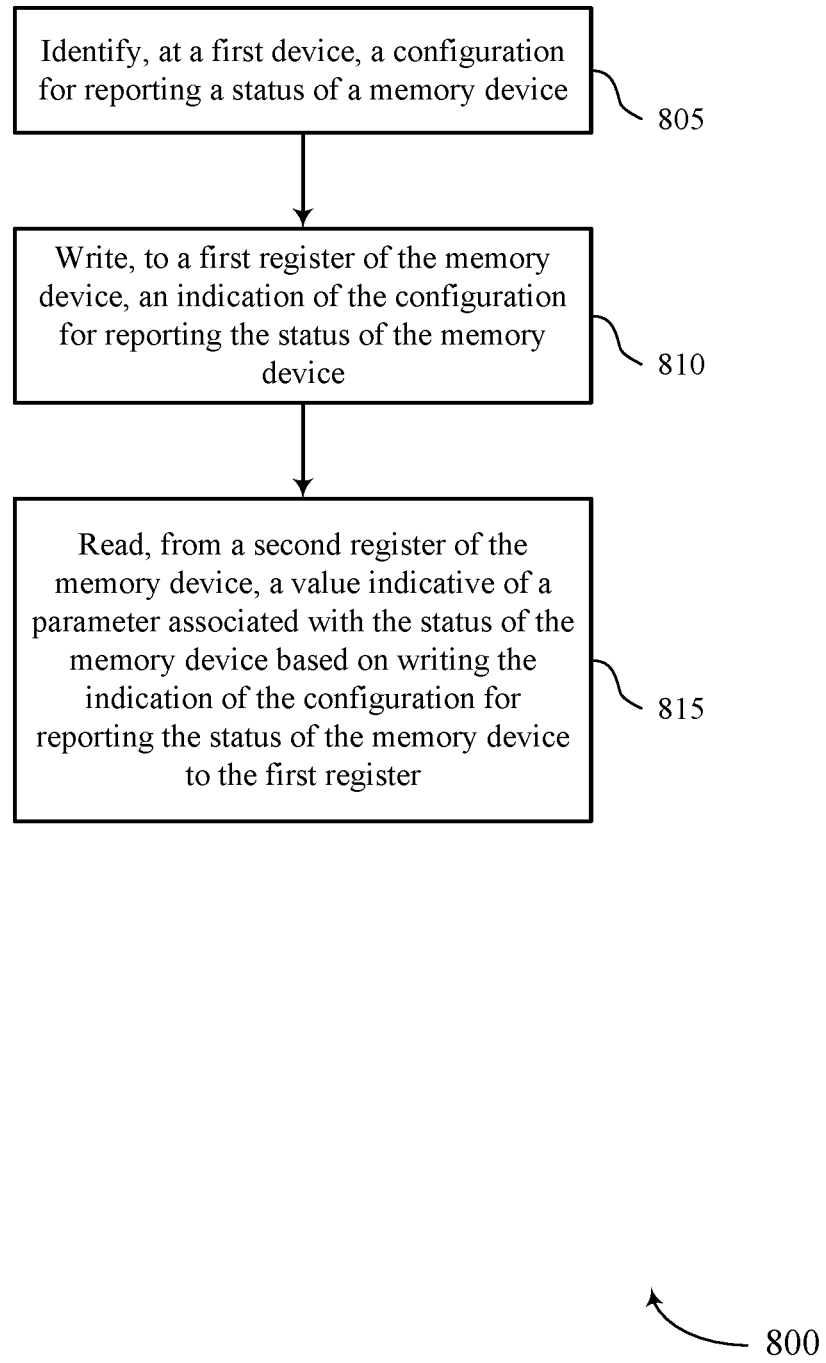

FIG. 8 shows a flowchart illustrating a method or methods 800 that supports monitoring and reporting a status of a memory device in accordance with aspects of the present disclosure. The operations of method 800 may be implemented by a host device or its components as described herein. For example, the operations of method 800 may be performed by a host device as described with reference to FIG. 6. In some examples, a host device may execute a set of instructions to control the functional elements of the host device to perform the described functions. Additionally or alternatively, a host device may perform aspects of the described functions using special-purpose hardware.

At 805, the host device may identify, at a first device, a configuration for reporting a status of a memory device. The operations of 805 may be performed according to the methods described with reference to FIGS. 3 and 4. In some examples, aspects of the operations of 805 may be performed by a configuration determination component as described with reference to FIG. 6.

At 810, the host device may write, to a first register of the memory device, an indication of the configuration for reporting the status of the memory device. The operations of 810 may be performed according to the methods described with reference to FIGS. 3 and 4. In some examples, aspects of the operations of 810 may be performed by a configuration notification component as described with reference to FIG. 6.

At 815, the host device may read, from a second register of the memory device, a value indicative of a parameter associated with the status of the memory device based on writing the indication of the configuration for reporting the status of the memory device to the first register. The operations of 815 may be performed according to the methods described with reference to FIGS. 3 and 4. In some examples, aspects of the operations of 815 may be performed by a status reading component as described with reference to FIG. 6.

In some examples, an apparatus as described herein may perform a method or methods, such as the method 800. The apparatus may include features, means, or instructions (e.g., a non-transitory computer-readable medium storing instructions executable by a processor) for identifying, at a first device, a configuration for reporting a status of a memory device, writing, to a first register of the memory device, an indication of the configuration for reporting the status of the memory device, and reading, from a second register of the memory device, a value indicative of a parameter associated with the status of the memory device based on writing the indication of the configuration for reporting the status of the memory device to the first register.

Some examples of the method 800 and the apparatus described herein may further include operations, features, means, or instructions for transmitting, to a second device, an indication of the parameter associated with the status of the memory device based on reading the value indicative of the parameter associated with the status of the memory device.

In some examples of the method 800 and the apparatus described herein, writing the indication of the configuration for reporting the status of the memory device may include operations, features, means, or instructions for writing an indication of a sensitivity level for triggering an alarm associated with reporting the status of the memory device.

In some examples of the method 800 and the apparatus described herein, writing the indication of the configuration for reporting the status of the memory device may include operations, features, means, or instructions for writing an indication of an action for responding to an alarm associated with the status of the memory device.

In some examples of the method 800 and the apparatus described herein, writing the indication of the configuration for reporting the status of the memory device may include operations, features, means, or instructions for writing an indication of one or more subsystems of the memory device for which to report the status of the memory device.

In some examples of the method 800 and the apparatus described herein, writing the indication of the configuration for reporting the status of the memory device may include operations, features, means, or instructions for writing an indication of a type of indicator to use to report the status of the memory device.

In some examples of the method 800 and the apparatus described herein, writing the indication of the configuration for reporting the status of the memory device may include operations, features, means, or instructions for writing an indication to report the status of the memory device using a code for the parameter associated with the status of the memory device, where the code includes a value indicative of a level of wear of a subsystem of the one or more subsystems of the memory device or a code indicative of an error of the subsystem of the one or more subsystems of the memory device.

Some examples of the method 800 and the apparatus described herein may further include operations, features, means, or instructions for writing the indication of the configuration for reporting the status of the memory device may be based on a boot event for the memory device.

It should be noted that the methods described above describe possible implementations, and that the operations and the steps may be rearranged or otherwise modified and that other implementations are possible. Furthermore, portions from two or more of the methods may be combined.

An apparatus is described. The apparatus may include a first register configured to receive, from a source external to the apparatus, an indication of a configuration for reporting a status of the apparatus, a second register configured to receive one or more parameters associated with the status of the apparatus and configured to be read by the source external to the apparatus, and a monitoring component configured to monitor the status of one or more parameters of the apparatus, determine a parameter of the one or more parameters associated with the status of the apparatus based on monitoring the status of the apparatus and the configuration for reporting the status of the apparatus, and write a value indicative of the parameter associated with the status of the apparatus to the second register.

Some examples may further include receiving, via the configuration for reporting the status of the apparatus, an indication of one or more subsystems of the apparatus for which to report the status of the apparatus.

Some examples may further include determining one or more other parameters associated with the status of the one or more subsystems based on monitoring the status of the apparatus and the configuration for reporting the status of the apparatus, and write respective values indicative of each of the one or more other parameters to the second register of the apparatus, where the parameter and the one or more other parameters each include an indicator of a type of a status for a respective subsystem of the one or more subsystems of the apparatus.

Some examples may further include writing a code indicative of an error of a subsystem of the one or more subsystems of the apparatus to the second register based on monitoring the status of the apparatus and the configuration for reporting the status of the apparatus, where the parameter associated with the status of the apparatus includes the code indicative of the error.

Some examples of the apparatus may include writing a value indicative of a level of wear of a subsystem of the one or more subsystems of the apparatus to the second register based on monitoring the status of the apparatus and the configuration for reporting the status of the apparatus, where the parameter associated with the status of the apparatus includes the value indicative of the level of wear of the subsystem.

In some examples, the first register and the second register each include a mode register of the apparatus.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   monitoring a health status of one or more parameters of a memory device, wherein the health status is based at least in part on wear information associated with the memory device;
   receiving, at a first register of the memory device and from a source external to the memory device, a configuration for reporting the health status of the memory device;
   determining a parameter of the one or more parameters indicative of a level of wear of the memory device based at least in part on monitoring the health status of the one or more parameters of the memory device and the configuration for reporting the health status of the memory device; and writing a value indicative of the parameter associated with the level of wear of the memory device to respective bit indices of a second register of the memory device that is configured to be read by the source external to the memory device, wherein the respective bit indices indicate the level of wear of the memory device.

2. The method of claim 1, wherein receiving the configuration for reporting the health status of the memory device comprises:
receiving an indication of a sensitivity level for triggering an alarm associated with reporting the health status of the memory device.

3. The method of claim 1, wherein receiving the configuration for reporting the health status of the memory device comprises:
receiving an indication of an action for responding to an alarm associated with the health status of the memory device.

4. The method of claim 1, wherein receiving the configuration for reporting the health status of the memory device comprises:
receiving an indication of a type of indicator to use to report the health status of the memory device.

5. The method of claim 4, wherein the type of indicator comprises a flag associated with a status of the parameter, or a code associated with a condition for the parameter associated with the health status of the memory device.

6. The method of claim 1, wherein receiving the configuration for reporting the health status of the memory device comprises:
receiving an indication of one or more subsystems of the memory device for which to report the health status of the memory device.

7. The method of claim 6, further comprising:
determining one or more other parameters associated with the health status of the one or more subsystems based at least in part on monitoring the health status of the memory device and the configuration for reporting the health status of the memory device; and
writing a respective value indicative of each of the one or more other parameters to the second register of the memory device, wherein the parameter and the one or more other parameters each comprise an indicator of a health status for a respective subsystem of the one or more subsystems of the memory device.

8. The method of claim 6, further comprising:
writing a code indicative of an error of a subsystem of the one or more subsystems of the memory device to the second register based at least in part on monitoring the health status of the memory device and the configuration for reporting the health status of the memory device, wherein the parameter associated with the health status of the memory device comprises the code indicative of the error.

9. The method of claim 6, further comprising:
writing a value indicative of a level of wear of a subsystem of the one or more subsystems of the memory device to the second register based at least in part on monitoring the health status of the memory device and the configuration for reporting the health status of the memory device, wherein the parameter associated with the health status of the memory device comprises the value indicative of the level of wear of the subsystem.

10. The method of claim 1, wherein the health status is further based at least in part on a failure event associated with the memory device.

11. The method of claim 1, wherein the wear information is associated with a system or subsystem of the memory device satisfying a wear threshold, a level of wear or usage of the system or subsystem of the memory device, or any combination thereof.

12. An apparatus, comprising:
a first register configured to receive, from a source external to the apparatus, a configuration for reporting a health status of the apparatus;
a second register configured to receive one or more parameters associated with the health status of the apparatus and configured to be read by the source external to the apparatus; and
a monitoring component configured to:
monitor the health status of one or more parameters of the apparatus, wherein the health status is based at least in part on wear information associated with the apparatus;
determine a parameter of the one or more parameters indicative of a level of wear of the apparatus based at least in part on monitoring the health status of the apparatus and the configuration for reporting the health status of the apparatus; and
write a value indicative of the parameter associated with the level of wear of the apparatus to respective bit indices of the second register, wherein the respective bit indices indicate the level of wear of the apparatus.

13. The apparatus of claim 12, wherein the first register is further configured to:
receive, via the configuration for reporting the health status of the apparatus, an indication of one or more subsystems of the apparatus for which to report the health status of the apparatus.

14. The apparatus of claim 13, wherein the monitoring component is further configured to:
determine one or more other parameters associated with the health status of the one or more subsystems based at least in part on monitoring the health status of the apparatus and the configuration for reporting the health status of the apparatus; and
write respective values indicative of each of the one or more other parameters to the second register of the apparatus, wherein the parameter and the one or more other parameters each comprise an indicator of a type of a health status for a respective subsystem of the one or more subsystems of the apparatus.

15. The apparatus of claim 13, wherein the monitoring component is further configured to:
write a code indicative of an error of a subsystem of the one or more subsystems of the apparatus to the second register based at least in part on monitoring the health status of the apparatus and the configuration for reporting the health status of the apparatus, wherein the parameter associated with the health status of the apparatus comprises the code indicative of the error.

16. The apparatus of claim 13, further comprising:
writing a value indicative of a level of wear of a subsystem of the one or more subsystems of the apparatus to the second register based at least in part on monitoring the health status of the apparatus and the configuration for reporting the health status of the apparatus, wherein the parameter associated with the health status of the apparatus comprises the value indicative of the level of wear of the subsystem.

17. The apparatus of claim 12, wherein the first register and the second register each comprise a mode register of the apparatus.

18. A method, comprising:
 identifying, at a first device, a configuration for reporting a health status of a memory device, wherein the health status is based at least in part on wear information associated with the memory device;
 writing, to a first register of the memory device, the configuration for reporting the health status of the memory device; and
 reading, from respective bit indices of a second register of the memory device, a value indicative of a parameter associated with a level of wear of the memory device based at least in part on writing the configuration for reporting the health status of the memory device to the first register, wherein the respective bit indices indicate the level of wear of the memory device.

19. The method of claim 18, further comprising:
 transmitting, to a second device, an indication of the parameter associated with the level of wear of the memory device based at least in part on reading the value indicative of the parameter associated with the level of wear of the memory device.

20. The method of claim 18, wherein writing the configuration for reporting the health status of the memory device comprises:
 writing an indication of a sensitivity level for triggering an alarm associated with reporting the health status of the memory device.

21. The method of claim 18, wherein writing the configuration for reporting the health status of the memory device comprises:
 writing an indication of an action for responding to an alarm associated with the health status of the memory device.

22. The method of claim 18, wherein writing the configuration for reporting the health status of the memory device comprises:
 writing an indication of one or more subsystems of the memory device for which to report the health status of the memory device.

23. The method of claim 22, wherein writing the configuration for reporting the health status of the memory device comprises:
 writing an indication of a type of indicator to use to report the health status of the memory device.

24. The method of claim 22, wherein writing the configuration for reporting the health status of the memory device comprises:
 writing an indication to report the health status of the memory device using a code for the parameter associated with the level of wear of the memory device, wherein the code comprises a value indicative of a level of wear of a subsystem of the one or more subsystems of the memory device or a code indicative of an error of the subsystem of the one or more subsystems of the memory device.

25. The method of claim 18, wherein:
 writing the configuration for reporting the health status of the memory device is based at least in part on a boot event for the memory device.

\* \* \* \* \*